United States Patent [19]
Bae et al.

[11] Patent Number: 5,516,821
[45] Date of Patent: May 14, 1996

[54] POLYMER STABILIZER AND POLYMER COMPOSITIONS STABILIZED THEREWITH

[75] Inventors: Kook-Jin Bae, East Northport; Stuart D. Brilliant, Levittown; Michael R. Croce, Brooklyn, all of N.Y.

[73] Assignee: Argus Chemical Corporation, New York, N.Y.

[21] Appl. No.: 402,155

[22] Filed: Mar. 9, 1995

Related U.S. Application Data

[63] Continuation of Ser. No. 219,241, Mar. 29, 1994, abandoned, which is a continuation of Ser. No. 950,737, Sep. 24, 1993, abandoned, which is a continuation of Ser. No. 686,308, Apr. 16, 1991, abandoned, which is a continuation of Ser. No. 527,633, May 21, 1990, abandoned, which is a continuation of Ser. No. 244,936, Sep. 15, 1988, abandoned.

[51] Int. Cl.$^6$ .................................................. C08K 5/58
[52] U.S. Cl. .................................................. 524/181
[58] Field of Search .................................... 524/180, 181, 524/182

[56] References Cited

U.S. PATENT DOCUMENTS

| | | | |
|---|---|---|---|
| 2,789,963 | 4/1957 | Hecker et al. | 524/181 |
| 3,205,189 | 9/1965 | Reed | 524/342 |
| 3,424,717 | 1/1969 | Gottlieb et al. | 524/181 |
| 3,562,305 | 2/1971 | Hoch | 524/181 |
| 3,640,950 | 2/1972 | Weisfeld | 524/181 |
| 3,810,868 | 5/1974 | Weisfeld et al. | 524/180 |
| 3,925,309 | 12/1975 | Weisfeld et al. | 524/181 |
| 3,933,741 | 1/1976 | Larkin et al. | 524/181 |
| 4,611,012 | 9/1986 | Muller | 524/181 |
| 4,728,677 | 3/1988 | Lacatus et al. | 524/181 |
| 4,755,414 | 7/1988 | Lacatus et al. | 524/181 |
| 4,822,833 | 4/1989 | Zappia et al. | 524/181 |
| B1 3,640,950 | 2/1986 | Weisfeld | 524/181 |

OTHER PUBLICATIONS

Rabek et al: *J. Applied Polymer Science*, vol. 21, 2211–2223 (1977).

Klimsch et al: *Plaste Und Kautschuk*, vol. 16, No. 4, 242–251 (1969) and English Translation.

*Primary Examiner*—Veronica P. Hoke
*Attorney, Agent, or Firm*—Lockwood, Alex, Fitzgibbon & Cummings

[57] ABSTRACT

Blends of methyltin mercapto carboxylic acid esters and butyltin carboxylates which form homogeneous stable liquid mixtures and provide initial color control, processing heat stability, as well as light stability to chlorinated polymers are disclosed. As these compositions are homogeneous liquids at ambient temperatures they can be readily measured and mixed into the resins, and are thus easy to formulate, market and use.

19 Claims, No Drawings

POLYMER STABILIZER AND POLYMER COMPOSITIONS STABILIZED THEREWITH

This application is a continuation of application Ser. No. 08/219,241, filed Mar. 29, 1994, now abandoned, which is a continuation of application Ser. No. 07/950,737, filed Sep. 24, 1993, now abandoned, which is a continuation of application Ser. No. 07/686,308, filed Apr. 16, 1991, now abandoned, which is a continuation of application Ser. No. 07/527,633 filed May 21, 1990, now abandoned, which is a continuation of application Ser. No. 07/244,936 filed Sep. 15, 1988, now abandoned.

BACKGROUND OF THE INVENTION

The present invention relates to stabilizer compositions for polyvinyl chloride resins and to polyvinyl chloride resin compositions having improved resistance to degradation caused by heat and light. More particularly, the present invention relates to liquid stabilizer compositions comprising at least one methyltin compound and one butyltin compound wherein each compound has mercapto carboxylic acid ester and/or carboxylate moieties. In this regard, the stabilizers of the present invention are characterized by visual homogeneity. In addition, the polyvinyl chloride resin compositions incorporating these stabilizers exhibit a favorable balance of the critical parameters of initial color control, processing heat stability, and long term resistance to change in color and mechanical properties when exposed to light and ultraviolet, i.e. light stability.

As is well known to those skilled-in-the-art, various halogen-containing polymers, particularly vinyl halide polymers that include homopolymers of vinyl chloride and copolymers of vinyl chloride with other monomers, may degrade when subjected to heat or light for an extended period as manifested by darkening of the resin and by an increase in brittleness. These defects may render the resin unsuitable for many uses because the darkening produces an unsightly appearance, and the increased brittleness may cause mechanical failures. A wide variety of materials has heretofore been proposed to stabilize halogen-containing polymers.

For instance, the use of organotin mercapto carboxylic acid esters as stabilizers for polyvinyl chloride resins is well known, and is generally set forth in such early patents as U.S. Pat. Nos. 2,753,825 to Leistner et al., issued Jun. 26, 1956, 2,641,596 to Leistner et al., issued Jun. 9, 1953, and 2,648,650 to Weinberg et al., issued Aug. 11, 1953. These organotin compounds have in common a hydrocarbon group directly attached to the tin atom through a carbon atom, and a sulfur-containing radical attached to the tin atom through the sulfur atom.

This type of organotin stabilizer is recognized as being among the most effective stabilizers for inhibiting the degradation of polyvinyl chloride resins at the high temperatures, e.g. 350° F. to 400° F., to which they are subjected during processing. Resins stabilized only with these organotin mercapto carboxylic acid esters, however, do not exhibit the degree of light stability often desired for applications such as siding, and window and door profiles wherein resistance to change in color and mechanical properties when exposed to light and ultraviolet is an important factor.

Several types of sulfur-free organotin compounds have been suggested in which a hydrocarbon group is directly attached to tin through a carbon atom, and an oxygen-containing group, such as an ester group, is attached to tin through oxygen. This type of stabilizer is also well known and is generally set forth in numerous patents including U.S. Pat. No. 2,344,002 to Rugeley et al., issued Mar. 14, 1944. Organotin compounds of this type, such as dibutyltin dilaurate, are excellent light stabilizers but are relatively poor heat stabilizers at the high temperatures, such as 350° F. to 400° F., commonly used today to process polyvinyl chloride compositions for siding, and window and door profiles.

A number of organotin stabilizers have been proposed that include a mercapto carboxylic acid ester moiety as well as a carboxylate moiety in a single compound or in a combination of two or more compounds. For example, U.S. Pat. No. 2,914,506 to Mack et al. discloses compounds broadly defined by the formula R R' Sn (SX) (Z) wherein R and R' may be the same or different monovalent hydrocarbon radicals, SX may be, among other things, an ester of a mercapto acid, and Z may be, among other things, a carboxylic acid linked through the oxygen of the carboxylic acid group to the tin atom.

United Kingdom Patent No. 1,008,845 to Smith, discloses a multicomponent stabilizer for ethylenically unsaturated monomers including chlorine-containing monomers. These multicomponent stabilizers include at least three different types of organotin compounds with a variety of other additives. Included within the three types of organotin compounds are diorganotin mercapto acid esters and diorganotin carboxylates.

According to U.S. Pat. No. 3,562,305 to Hoch, the incorporation into an organotin mercapto acid ester of a small amount of organotin carboxylate yields products having a substantially reduced tendency to decompose on standing and are at least as effective as the untreated organotin mercapto acid esters as stabilizers for vinyl halide resin compositions.

United Kingdom Patent No. 1,251,864 to M&T International N.V., discloses compositions for stabilizing halogen-containing resins against the deteriorative effects of heat which compositions can comprise an organotin mercapto acid ester, such as dibutyltin bis (iso-octyl) mercaptoacetate, and an organotin carboxylate such as butyltin tris (laurate). Additionally, U.S. Pat. No. 4,698,368 to Muller, discloses a stabilizer composition that can include an organotin mercaptopropionate and an organotin carboxylate.

These patents as well as others, such as U.S. Pat. No. 3,810,868 to Weisfeld et al., provide sufficient information to those skilled-in-the-art to produce these organotin mercapto acid esters and organotin carboxylates.

It is also well known to those skilled-in-the-art to incorporate additives such as phenolic antioxidants in the organotin stabilizer compositions for enhanced performance. The art is replete with examples of such additives such as those disclosed in U.S. Pat. Nos. 3,398,114 to Pollock, 3,424,717 to Gottlieb et al. and 4,418,169 to Gibbons et al.

Many of these stabilizers and additives have achieved some measure of success at stabilizing halogen-containing resins against the degradative action of heat and light, but there are many applications in which a greater degree of heat and light stability is desired than has heretofore been readily attainable. Additionally, not all of these stabilizers are homogeneous liquids at room temperatures. Such homogenity is a characteristic often desired by end users for handling and processing ease. Those skilled-in-the-art recognize that although certain organotin stabilizers exhibit different heat and light stability properties there is no definitive predictive rule for providing a stabilizer composition that has all the features of liquid homogeneity, initial color control, processing heat stability, light stability, and overall processability.

For example, U.S. Pat. No. 4,418,169 to Gibbons et al., notes it has been suggested that the dialkyltin diesters such as dibutyltin dilaurate and dibutyltin maleate, which are highly effective in preventing the light-induced degradation of polymers, be combined with a secondary or auxiliary heat stabilizer to improve their ability to protect the vinyl chloride polymers against heat degradation. According to the '169 patent, typical of such auxiliary heat stabilizers are the alkylated methylene bisphenols, which may be capable of increasing the heat stability of polymer compositions somewhat but which may also have a pronounced deleterious effect upon light stability. In this regard, the '169 patent states it is not uncommon for such auxiliary heat stabilizers to reduce the light stability of the polymer composition to as little as 20% of that which may be obtained in the absence of such a stabilizer.

Accordingly, a general object of the present invention is to provide an improved stabilizer composition.

It is another object of the present invention to provide a stabilizer composition that is a homogeneous liquid at room temperature.

It is another object of the present invention to provide a method of stabilizing halogen-containing organic polymer or resin compositions, particularly vinyl halide polymers, against heat and light degradation.

It is a further object of the present invention to provide novel stabilized halogen-containing polymers.

These and other objects of the present invention will be apparent to those skilled-in-the-art from the following description.

SUMMARY OF THE INVENTION

It has now been found that blends of a methyltin mercapto carboxylic acid ester and a butyltin carboxylate form homogeneous stable liquid mixtures and provide initial color control, processing heat stability, as well as light stability to chlorinated polymers. As these compositions are homogeneous liquids at ambient temperatures they can be readily measured and mixed into the resins, and are thus easy to formulate, market and use.

DETAILED DESCRIPTION OF THE INVENTION

The polymers or resins which may be stabilized by practice of this invention may be halogen-containing organic polymers typically those which contain chlorine atoms bonded to the polymer chain. These polymers may be homopolymers including polyvinyl chloride-type polymers, e.g. polyvinyl chloride. These polymers may also include copolymers formed by the copolymerization of vinyl chloride with other ethylenically unsaturated monomers. Ethylenically unsaturated monomers may be compounds which contain polymerizable carbon-to-carbon double bonds and may include alpha olefins such as ethylene, propylene, and 1-hexene; acrylates, such as acrylic acid, ethyl acrylate, acrylonitrile; vinyl monomers, such as styrene, vinyl acetate; and/or maleates, such as maleic acid, maleic anhydride, maleate esters. For convenience, reference will be hereinafter made to vinyl chloride polymers.

The present invention has particular applicability to rigid polymers and more particularly to those rigid polymers subject to weatherability such as siding, and window and door profiles. These rigid polymers may include impact modifiers, pigments and/or fillers, lubricants, etc., in addition to the resin and stabilizer. The vinyl chloride polymers may in addition also include other conventional additives and ingredients.

In accordance with the present invention, these vinyl chloride polymers are effectively stabilized against the degradative effects of processing, heat and light by appropriate incorporation of a blend of a methyltin mercapto carboxylic acid ester and a butyltin carboxylate. Typically, for the commercial processing of rigid polyvinyl chloride, the stabilizer is conveniently mixed with all or a portion of the polymer to be stabilized with vigorous agitation under such conditions of time and temperature that the stabilizer is sufficiently imbibed by the polymer to produce a dry, free-flowing powder.

The organotin mercapto carboxylic acid esters of the present invention can be represented by the following structural formula $R_mSnX_{(4-m)}$ wherein R is methyl and X represents an ester of a mercapto carboxylic acid having 2 to 6 carbon atoms with an alcohol having 4 to 14 carbon atoms whose sulfur atom is linked to the tin atom and m is 1 or 2. Illustrative of these compounds are the following: Monomethyltin tris isooctylthioglycolate, dimethyltin bis isooctylthioglycolate, monomethyltin bis isooctyl-3-mercaptopropionate, dimethyltin bis isooctyl-3-mercaptopropionate, monomethyltin tris 2-ethylhexylthioglycolate, dimethyltin bis 2-ethylhexylthioglycolate, monomethyltin tris 2-ethylhexyl- 3-mercaptopropionate, dimethyltin bis 2'-ethylhexyl-3-mercaptopropionate, and the like. In accordance with the aspects of providing a homogeneous stabilizer and long term heat stability to the resin, preferred methyltin mercapto acid ester stabilizers are the methyltin isooctylthioglycolates such as monomethyltin tris isooctylthioglycolate and dimethyltin bis isooctylthioglycolate. In accordance with other aspects of the invention, such as providing the vinyl chloride polymers with initial color control and processing heat stability, preferably a mixture of monomethyltin mercapto carboxylic acid ester and dimethyltin mercapto carboxylic acid ester is present. More preferably, a mixture of dimethyltin isooctylthioglycolate and monomethyltin isooctylthioglycolate in proportions of approximately four parts by weight to one part by weight, respectively, is present.

The butyltin carboxylates of the present invention can be represented by the structural formula $R'_nSnY_{(4-n)}$ wherein R' is butyl, Y represents

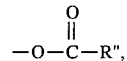

R" is selected from the group consisting of alkyl groups having from 8 to 13 carbon atoms and alkenyl groups having from 8 to 21 carbon atoms, and n is 1 to 2.

Illustrative of these organotin carboxylates are the following: Dibutyltin dioctanoate, dibutyltin didecanoate, dibutyltin neodecanoate, dibutyltin dilaurate, dibutyltin dioleate, dibutyltin ditallate, and the like.

In accordance with the objectives of the present invention, preferred butyltin carboxylates are dibutyltin dilaurate, dibutyltin dioleate, and dibutyltin ditallate.

It has been found that when methyltin mercapto carboxylic acid esters, such as methyltin isooctylthioglycolates, are blended with butyltin carboxylates such as dibutyltin dilaurate, a homogeneous stable liquid mixture is formed. Preferably the blend comprises 25–75% by weight of the methyltin mercapto carboxylic acid ester and 25–75% by weight of the butyltin carboxylate. More preferably, the blend comprises approximately 50% by weight of the methyltin mercapto carboxylic acid ester and approximately 50% by weight of the butyltin carboxylate. Most preferably the blend comprises a mixture of 46% by weight of the methyltin mercapto carboxylic acid ester and 54% by weight of the butyltin carboxylate.

These blends may be used in stabilizing amounts to inhibit the heat and light induced degradation of a vinyl chloride polymer. Typically, these blends may be used in amounts of 0.1 to 10 parts by weight of 100 parts by weight of the vinyl chloride polymer. Preferably these blends may be used in the amount of 0.5 to 3, and more preferably 1.0 to 1.75, parts per 100 parts of vinyl halide polymer.

The blends of the present invention can also include an antioxidant component that can be any organic compound capable of inhibiting deterioration of organic substances in the presence of oxygen. Preferred antioxidant components are the phenolic antioxidants such as 1,1,3-tris (2-methyl-4-hydroxy-5-t-butylphenyl) butane. Typically, the phenolic antioxidant component will be used in an amount of 0.1 to 5 parts per weight of the blend of organotin mercapto carboxylic acid ester and organotin carboxylate. More preferably, the antioxidant is used in an amount of approximately 3% by weight of such blend. Polyvinyl polymers stabilzied with blends of the present invention including small percentages of such phenolic antioxidants can exhibit improved heat stability with little or no loss of light stability compared to polyvinyl polymers stabilized with such blends but without the added phenolic antioxidant.

The novel heat and light stable compositions of this invention may be formulated by such techniques as milling, dry blending, Banbury blending, or any other commonly employed formulating technique. The methyltin mercapto carboxylic acid esters and the butyltin carboxylates of the present invention may be prepared by any suitable and convenient procedure. For example, they may be prepared individually or in-situ by appropriate reaction of an organotin oxide or organotin halide.

In most cases, the organotin mercapto carboxylic acid esters and the organotin carboxylates will be prepared separately and subsequently blended together to provide the ability to customize blends for particular needs of end-users. When both the methyltin mercapto carboxylic acid ester and the butyltin carboxylates are liquids, the blend is prepared by simply mixing the organotin mercapto carboxylic acid ester in the organotin carboxylate at room temperature. When one of the components of the blend, such as the organotin carboxylate, is a solid, the organotin compounds are generally mixed together at room temperature, and the mixture is heated at a temperature in the range of approximately 160° F. to 180° F. until a clear solution is obtained and then cooled.

Although the invention, so far, has been described in terms of a methyltin mercapto carboxylic acid ester and a butyltin carboxylate, it is contemplated that a combination of methyltin carboxylates and butyltin mercapto carboxylic acid esters may be used without departing from the present invention. In this regard, it has recently been suggested that certain organotin compounds may be susceptible to ligand exchange. Presently, it is generally accepted that any ligand exchange occurring between organotin compounds does not involve exchange between the organo portion, i.e. the carbon to tin bond, of the compounds.

Accordingly, although not being limited to any theory of the invention other than the presence of a methyltin compound and a butyltin compound in association with mercapto carboxylic acid ester moieties and carboxylate moieties, the present invention includes compositions comprising a first organotin compound being represented by the structural formula $R_mSnX_aY_b$ and a second organotin compound represented by the structural formula $R'_nSnX_cY_d$ wherein R is methyl, R' is butyl, X represents an ester of a mercapto carboxylic acid having 2 to 6 carbon atoms with an alcohol having 4 to 14 carbon atoms, whose sulfur atom is linked to the tin atom, Y represents

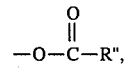

wherein R" is selected from the group consisting of alkyl groups having from 8 to 13 carbon atoms and alkenyl groups having from 8 to 21 carbon atoms, m is 1 or 2, n is 1 or 2, a is an integer from 0 to 3, b is an integer from 0 to 3, c is an integer from 0 to 3, d is an integer from 0 to 3, subject to the provisos that a+b is 2 or 3, a+b+m=4, c+d is 2 or 3, c+d+n=4, if a=0 then c is at least 1 and if b=0 then d is at least 1.

The following data illustrate, but are not meant to limit, the invention.

I. The heat stabilization properties of blends of the present invention were tested and compared to other compositions by a standard Brabender heat stability test conducted over time at a temperature of 190° C. The polyvinyl chloride composition used to evaluate the effectiveness of the blends of the present invention was a standard rigid polyvinyl chloride polymer formulation for use in siding, having the formulation:

| INGREDIENT | PARTS BY WEIGHT |
| --- | --- |
| VINYL CHLORIDE HOMOPOLYMER | 100 |
| METHACRYLATE-BUTADIENE STYRENE IMPACT MODIFIER | 6 |
| ACRYLIC PROCESSING AID | 1 |
| ACRYLIC PROCESSING AID | 0.5 |
| CALCIUM STEARATE | 1.2 |
| PARAFFIN WAX 160° F. MP | 1 |
| TITANIUM DIOXIDE | 6 |

| SAMPLE NO./ STABILIZER NO. | PARTS STABILIZER PER 100 PARTS OF HOMO- POLYMER BY WEIGHT | DESCRIPTION |
| --- | --- | --- |
| 1/1 | 0.8 | Blend consisting of approximately 80% dimethyltin bis isooctylthioglycolate and 20% monomethyltin isooctylthioglycolate, by weight. |
| 2/2 | 1.6 | Stabilizer 1. |

|  |  |  |
|---|---|---|
| 3/3 | 1.6 | Blend consisting of approximately 50% dibutyltin bis isooctylthioglycolate and 50% dibutyltin dilaurate, by weight. |
| 4/4 | 1.6 | Stabilizer of the present invention consisting of a blend of Stabilizer 1 and dibutyltin dilaurate in the approximate ratio of 46:54, by weight. |
| 5/5 | 1.6 | Another stabilizer of the present invention consisting of a blend of approximately 97% of Stabilizer 4 and 3% of phenolic antioxidant, 1,1,3-tris (2-methyl-4-hydroxy-5-t-butylphenyl) butane, by weight. |
| 6/6 | 1.6 | Blend consisting of approximately 50% Stabilizer 1 and 50% dimethyltin ditallate, by weight. |
| 7/7 | 1.6 | Blend consisting of approximately 50% Stabilizer 1 and 50% dimethyltin dineodecanoate, by weight. |

BRABENDER HEAT STABILITY TEST RESULTS

| SAMPLE/ STABILIZER | COLOR OF RESIN COMPOSITION AT 2 MINUTES | FIRST COLOR CHANGE IN MINUTES (COLOR) | TIME TO FAILURE |
|---|---|---|---|
| 1/1 | White-Light Cream | 4 minutes (light cream) | 8 minutes |
| 2/2 | White | 8 minutes (very light cream) | 16 minutes |
| 3/3 | White | 6 minutes (very light cream) | 10 minutes |
| 4/4 | White | 6 minutes (very light cream) | 12 minutes |
| 5/5 | White | 8 minutes (very light cream) | 16 minutes |
| 6/6* | White | 6 minutes (very light cream) | 16 minutes |
| 7/7 | White | 6 minutes (very light cream) | 12 minutes |

*STABILIZER BLEND DEPOSITED SOME PERCIPITATE

The above test results are based on visual evaluation and indicate that, in general, except for Sample 1 all of the stabilizers provided an adequate degree of both thermal and processing stability. The stabilizers of the present invention, Stabilizer 4 and Stabilizer 5, provided better thermal and processing stability then Stabilizer 3, a butyltin mercapto carboxylic acid ester and butyltin carboxylate blend. Additionally, Stabilizer 4 and Stabilizer 5 provided thermal and processing stability as good as or better than Stabilizer 7, a methyltin mercapto carboxylic acid ester and a methyltin dineodecanoate blend. Stabilizer 6, a methyltin mercapto carboxylic acid ester and dimethyltin ditallate blend, was not visually homogeneous.

II. The light stability of polyvinyl halide polymers stabilized by compositions of the present invention (i.e. Stabilizer 4, described in I, above) were evaluated by comparison with polyvinyl chloride compositions stabilized with the well known and widely used methyltin thioglycolates (i.e. Stabilizer 1, described in I, above). The light stability test conducted was an accelerated weathering exposure in the Q.U.V. Accelerated Weathering Tester, a well known test apparatus supplied by the Q-Panel Company. Samples of each composition were taken after 121, 288, 457, 619, 786, 932, 1282, 1329, 1805, 1970 and 2110 hours of exposure in the Q.U.V. apparatus. A visual comparison of these samples with one another at the same time of exposure and at different times of exposure was conducted to determine the extent to which the samples had changed from the initial white to off white, beige, and tan shades.

The formulation for all the samples tested was:

| INGREDIENT | PARTS BY WEIGHT |
|---|---|
| VINYL CHLORIDE HOMOPOLYMER | 100 |
| METHACRYLATE-BUTADIENE STYRENE IMPACT MODIFIER | 6 |
| ACRYLIC PROCESSING AID | 1 |
| ACRYLIC PROCESS AID | 0.5 |
| CALCIUM STEARATE | 1.2 |
| PARAFFIN WAX 160° F. MP | 1 |

The individual samples tested differed in the choice of stabilizer and in the amount of titanium dioxide pigment used, as follows:

| SAMPLE | STABILIZER* | PARTS STABILIZER PER 100 PARTS HOMOPOLYMER | PARTS TITANIUM DIOXIDE PER 100 PARTS HOMOPOLYMER |
| --- | --- | --- | --- |
| A | 1 | 1.5 | 10 |
| B | 1 | 1.5 | 8 |
| C** | 1 | 1.5 | 6 |
| D | 1 | 1.5 | 4 |
| E | 1 | 1.5 | 2 |
| F | 4 | 1.5 | 10 |
| G | 4 | 1.5 | 8 |
| H** | 4 | 1.5 | 6 |
| I | 4 | 1.5 | 4 |
| J | 4 | 1.5 | 2 |

*As described in Paragraph I above.
**Sample C and Sample H correspond, respectively, to Sample 2 and Sample 4 of Paragraph I above (except in Paragraph II the stabilizer level is 1.5 parts and in Paragraph I the stabilizer level is 1.6 parts).

In general the test results indicated that at each, respective, level of titanium dioxide the sample containing composition of the present invention (Stabilizer 4) is better in light stability than the corresponding sample containing only the organotin thioglycolate (Stabilizer 1). A more specific comparison, based upon visual evaluation of the relative degree of discoloration of the resin as a function of time, follows:

1. Comparing Samples A (Stabilizer 1) and F (Stabilizer 4) each containing 10 parts $TiO_2$.

Sample F is better than Sample A at each sampling through 786 hours;

Sample F at 457 hours is comparable to Sample A at 288 hours and can therefore be said to be about 50% better;

Sample F at 619 hours is better than Sample A at 457 hours and can therefore be said to confirm the 50% improvement in stability.

Sample F at 786 hours is comparable to Sample A at 619 hours, thus providing further confirmation of the improvement.

2. Comparing Sample A (Stabilizer 1) with 10 parts $TiO_2$ with Sample G (Stabilizer 4) having only 8 parts $TiO_2$.

Sample G is comparable to Sample A at 121 hours and again at 457 hours.

Sample G is better than Sample A at 288 hours.

3. Comparing Sample B (Stabilizer 1) with Sample G (Stabilizer 4), both samples containing 8 parts $TiO_2$.

Sample G is better than Sample B at each sampling through 786 hours.

Sample G at 288 hours is comparable to Sample B at 121 hours.

Sample G at 457 hours is comparable to Sample B at 288 hours.

Once again, the results show 50% or greater improvement in light stability for Stabilizer 4 (the present invention) compared to Stabilizer 1.

4. Comparing Sample B (Stabilizer 1 with 8 parts $TiO_2$) with Sample H (Stabilizer 4 with 6 parts $TiO_2$).

Sample H is better than Sample B at each sampling through 786 hours.

Sample H at 457 hours is comparable to Sample B at 288 hours.

Thus, Sample H can be said to be at least 25% better in light stability than Sample B.

5. Comparing Sample C (Stabilizer 1) with Sample H (Stabilizer 4), each containing 6 parts $TiO_2$.

Sample H is better than Sample C at each sampling through 786 hours.

Sample H at 457 hours is comparable to Sample C at 288 hours.

Sample H at 619 hours is comparable to Sample C at 457 hours.

Accordingly, Sample H can be said to be at least 50% better in light stability than Sample C.

6. Comparison of Sample C (Stabilizer 1 at 6 parts $TiO_2$) with Sample I (Stabilizer 4 at 4 parts $TiO_2$).

Sample I is comparable to Sample C at 121 hours and again at 288 hours.

Accordingly, Sample I can be said to be at least 33% better in light stability than Sample C.

7. Comparison of Sample D (Stabilizer 1) with Sample I (Stabilizer 4), both containing 4 parts $TiO_2$.

Sample I is better than Sample D at each sampling through 786 hours.

Sample I at 288 hours is comparable to Sample D at 121 hours.

Sample I at 457 hours is comparable to Sample D at 288 hours.

Thus, Sample I can be said to be at least 50% better in stability than Sample D.

8. Comparison of Sample D (Stabilizer 1 at 4 parts $TiO_2$) with Sample J (Stabilizer 4 at 2 parts $TiO_2$).

Sample J is comparable to Sample D at 121 hours and at 288 hours.

9. Comparison of Sample E (Stabilizer 1) with Sample J (Stabilizer 4), both containing 2 parts $TiO_2$.

Sample J is better than Sample E at each sampling through 786 hours.

Sample J at 457 hours is comparable to Sample E at 288 hours, which represents at least 50% better light stability.

Summarizing, the above results are consistent throughout in demonstrating improved light stability of the formulation of the present invention, Stabilizer 4, mixed methyltin mercaptide/butyl carboxylate, compared to Stabilizer 1, methyltin mercaptide, over a range of $TiO_2$ levels. The comparison of the above stabilizers in this formulation has been confirmed by testing in another light exposure apparatus, a XENON ARC weather-ometer. In comparable exposure periods all the samples are much less discolored than in the QUV unit, but the relative ranking of the samples is the same.

The heat stability and light stability test results demonstrate the stabilizers of the present invention provide an adequate degree of both thermal and processing stability and provide better weatherability performance at equal levels of titanium dioxide than the blend of only methyltin mercapto carboxylic acid esters. Additionally, the stabilizers of the present invention require lower levels of titanium dioxide than do the blends of only methyltin mercapto carboxylic acid esters to provide comparable weatherability performance. The resulting benefit to the formulator goes beyond the economy of reduced TiO$_2$ requirement, it is particularly significant in formulating dark colored siding, where TiO$_2$ at conventional levels (10–12 parts) has been at best a necessary evil that needs to be overpowered by high concentration of red and/or brown color pigment.

While in the foregoing specification certain embodiments and examples of this invention have been described in detail, it will be apparent that modifications and variations therefrom will be apparent to this skilled in this art and that this invention is to be limited only by the scope of the appended claims.

What is claimed is:

1. A homogeneous liquid stabilizer for vinyl halide resin compositions that comprises (a) an organotin mercaptocarboxylic acid ester having the structural formula $$R_m SnX_{(4-m)}$$

wherein R is methyl and X represents an ester of a mercapto carboxylic acid having 2 carbon atoms with an alcohol having 4 to 14 carbon atoms whose sulfur atom is linked to the tin atom and m is 1 or 2; and (b) a butyltin carboxylate having the structural formula $$R'_n SnY_{(4-n)}$$

wherein, R' is butyl, Y represents —O—CO—R" wherein R" is selected from the group consisting of alkyl groups having from 8 to 13 carbon atoms, and n is 2.

2. The stabilizer of claim 1 wherein X is isooctylthioglycolate and Y is laurate.

3. The stabilizer of claim 1 wherein said stabilizer is prepared by blending dimethyltin bis isooctylthioglycolate and dibutyltin dilaurate.

4. The stabilizer of claim 3 wherein said blend further includes monomethyltin tris isooctylthioglycolate.

5. The stabilizer of claim 4 wherein the ratio of said monomethyltin tris isooctylthioglycolate and said dimethyltin bis isooctylthioglycolate to said dibutyltin dilaurate is approximately 1 to 1 by weight.

6. A method for stabilizing vinyl halide resin compositions against heat, processing and light degradation that comprises incorporating within a vinyl halide resin a homogeneous liquid stabilizer according to claim 1.

7. The method of claim 6 wherein the organotin mercapto acid ester comprises approximately 25% to 75% weight percent of the stabilizer and the organotin carboxylate comprises approximately 25% to 75% weight percent of the stabilizer.

8. The method of claim 7 wherein the ratio of organotin mercapto acid ester to organotin carboxylate is approximately 1:1 by weight.

9. The method of claim 7 wherein the ratio of organotin mercapto acid ester to the organotin carboxylate is approximately 45:55 by weight.

10. The method of claim 6 which further includes incorporating within the resin a phenolic antioxidant.

11. The method of claim 10 wherein the phenolic antioxidant is 1,1,3-tris (2-methyl-4-hydroxy-5-t-butylphenyl) butane.

12. The method of claim 10 wherein the phenolic antioxidant is approximately 0.1 to 5 weight percent of the stabilizer.

13. The method of claim 6 wherein X is isooctyl- thioglycolate.

14. The method of claim 6 wherein Y is selected from the group consisting of laurate, oleate and tallate, neodecanoate.

15. A method for making a weatherable vinyl halide resin comprising mixing a vinyl chloride homopolymer, a methacrylate- butadiene-styrene impact modifier, at least one processing aid selected from the group consisting of acrylic processing aids, calcium stearate and paraffin wax, a pigment and a homogeneous liquid stabilizer composition, said stabilizer composition including from 0.5 to 3% by weight of said homopolymer, of a blend of monomethyltin tris isooctylthioglycolate, dimethyltin bis isooctylthioglycolate, dibutyl tin dilaurate and 1,1,3-tris (2-methyl-4 -hydroxy-5-t-butylphenyl) butane.

16. The method of claim 15 wherein said blend is comprised of 25–75% by weight of said monomethyltin tris isooctylthioglycolate and said dimethyltin bis isooctylthioglycolate, 25–75% by weight of said dibutyltin dilaurate and 0.1–5% by weight of said 1,1,3-tris(2-methyl-4-hydroxy-5-t-butylphenyl) butane.

17. The stabilizer of claim 1 which further includes a phenolic antioxidant.

18. The stabilizer of claim 17 wherein the phenolic antioxidant is 1,1,3-tris(2-methyl-4-hydroxy-5-t-butylphenyl) butane.

19. The stabilizer of claim 17 wherein said stabilizer comprises dimethyltin his isooctylthioglycolate as 25 to 75 weight percent of the stabilizer, dibutyltin dilaurate as 25 to 75 weight percent of the stabilizer and said phenolic antioxidant is 0.1 to 5 weight percent of the stabilizer.

* * * * *